Dec. 31, 1940.   I. W. RIDER   2,226,833

BULLETPROOF GLASS MOUNTING UNIT

Filed Nov. 15, 1939

INVENTOR
IRVIN W. RIDER,
BY Minturn & Minturn,
ATTORNEYS.

Patented Dec. 31, 1940

2,226,833

UNITED STATES PATENT OFFICE 2,226,833

BULLETPROOF GLASS MOUNTING UNIT

Irvin W. Rider, Indianapolis, Ind., assignor to Perfection Windshield Company, Inc., Indianapolis, Ind., a corporation of Indiana Application November 15, 1939, Serial No. 304,491

2 Claims. (Cl. 296—84)

This invention relates to means for mounting heavy bulletproof glass in windshields of automobiles and a primary object of the invention is to provide such means which will permit the substitution of the bullet-proof glass for the usual relatively thin plate glass in the same supporting means. It is a purpose of the invention to provide a carrier which may be exactly replaceable with the original glass employed.

When automobiles leave the factory they are now commonly built to use a rubber molding around the windshield or front glass opening. This rubber molding is not only employed to carry the usual glass but is employed to provide water sealing between the glass and the marginal edges of the opening. The molding is provided with a continuous groove therearound into which the marginal edge of the glass is fitted. This molding and the general construction of the automobile about the front end is such that the thickness of the molding must be limited. By use of my invention this same identical molding is employed although the bulletproof glass is many times thicker than the customarily employed windshield glass.

It has been a common expedient when replacing the common glass with the bulletproof glass to employ a frame for the bulletproof glass of sufficient thickness to accommodate that glass. Then this frame would receive screws therethrough into newly bored holes in the metal surrounding the windshield opening. Due to the curvature and angularity of the body about the opening, it was practically impossible to secure a water-tight seal between the frame and the body. Moreover such a mounting was not only unsightly but insecure.

The gist of my invention resides in the use of an extremely light frame within which the bulletproof glass is mounted and carried and in the provision of a frame marginal lip of the same thickness and of the same identical contour as that of the glass which is to be replaced by the bulletproof glass. The marginal lip about the frame is received within the groove or slot provided in the rubber mounting.

Figure 1:
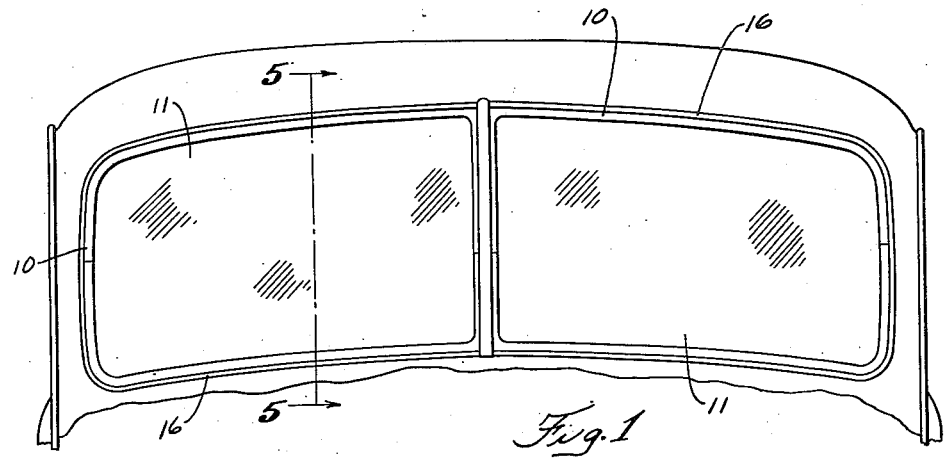
Figure 2:
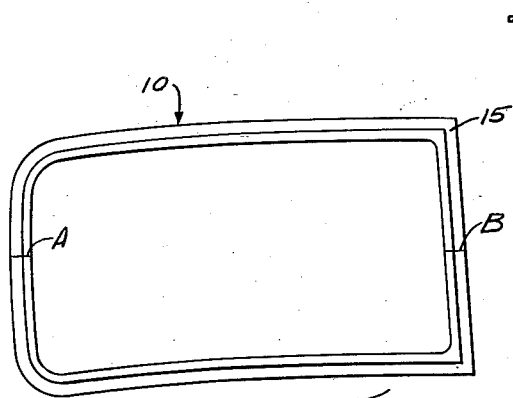
Figure 5:
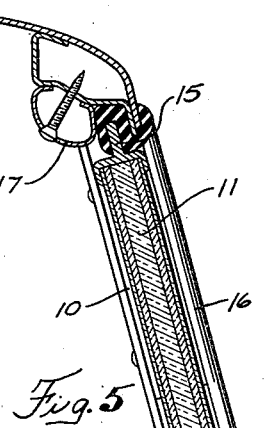
Figure 3:
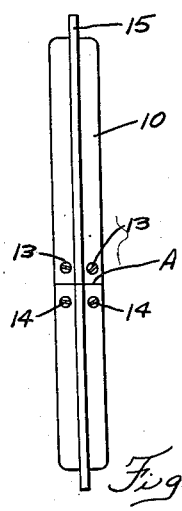
Figure 4:
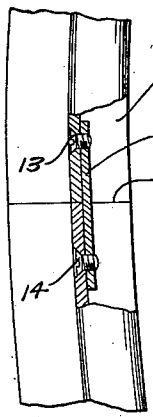

One particular form of the invention is herein described and shown by the accompanying drawing, in which:

Fig. 1 is a front elevation of an automobile front glass or windshield employing the invention;

Fig. 2, a front elevation of the replacement frame;

Fig. 3, an end elevation on a slightly enlarged scale;

Fig. 4, a detail in side elevation on a slightly greater enlarged scale illustrating the frame division joint; and, Fig. 5, a section on the line 5—5 in Fig. 1 on an enlarged scale.

Like characters of reference indicate like parts throughout the several views in the drawing.

I form the replacement frame generally designated by the numeral 10 in any suitable manner such as by stamping out of sheet metal or by casting. In the present form, the frame is shown in the cast form. It is preferably cast in one piece to have a relatively light section and is afterwards cut into two sections through the ends on some such lines as indicated at A and B. The casting is initially made in one piece in order that these ends will match each other perfectly when cut and brought together. If the frame is cast in two sections, it would be exceedingly difficult to bring the ends together properly since some warping generally occurs in the casting operations.

The frame 10 has a major U-shaped cross section to form a channel internally therearound within which the glass 11 is fitted and carried. The frame 10 is cut into the two sections in order that the frame may be brought around the marginal edges of the glass 11. By so doing, a separate retaining strip is avoided. While not necessarily so, it is preferably to employ some means to reunite the frame sections and hold them together securely so as to prevent accidental displacement of the glass 11 relative to the frame 10.

As indicated in Figs. 3 and 4, one such uniting means may be a plate 12 passing over the junction line A and receiving screws 13 and 14 through the frame sections. By such means, the glass 11 is safely retained within the frame 10 and the glass and frame then form a unit ready for replacement with the usual glass.

Surrounding the U-shaped channel of the frame 10 is an outwardly extending lip 15 extending entirely therearound in a common plane. Also the outer edge of this lip 15 is extended to give overall dimensions equal and conforming to the glass to be replaced or to the size of the glass that would ordinarily be used.

When the unit consisting of the frame 10 and the bulletproof glass 11 is to be assembled on the automobile, the usual rubber molding 16 is fitted around over the marginal lip 15 to have that lip engaged within the glass receiving slot as indicated in Fig. 5. This molding 16 has a slot entering from its outer peripheral face and extending entirely therearound to engage over metal lips provided on the automobile body. Then some type of metallic molding such as the molding 17 is brought up from the inside to bear against the molding 15 and compressibly urge it forwardly against the body margin so as to grip the lip 15 therein and thus provide not only a resilient carrying means but also to provide a very effective water seal.

As above indicated, the glass 11 although of many thicknesses greater than the lip 15 is neatly and safely carried within the usual opening all without having to drill new holes in the body or having to provide any additional sealing means. Furthermore, taking advantage of the usual rubber molding 16, this unusually heavy glass 11 is given a highly resilient support which is of considerable advantage.

While I have herein shown and described my invention in the one best form as now known to me, it is obvious that structural changes may be employed particularly in the forming of the frame itself, such as by stamping, all without departing from the spirit of the invention, and I therefore do not desire to be limited to that precise form beyond the limitations as may be imposed by the following claims.

I claim:

1. The combination with a structure having a window opening therein, a resilient molding having a groove around its external side, into which groove the marginal edge about said opening is received, said molding having a second groove entirely around its inner peripheral face, rigid molding means overlapping the resilient molding, means engaging with said structure tending to laterally compress the molding to reduce the width of both of said grooves, a glass frame, a lip extending around the periphery of the frame and entering said second groove and having an inwardly presented channel to receive therein the marginal portion of a sheet of glass, said lip being held and sealed in said resilient molding second groove by said compressing molding.

2. The combination with a structure having a window opening therein, a resilient molding having a groove around its external side, into which groove the marginal edge about said opening is received, said molding having a second groove entirely around its inner peripheral face, rigid molding means overlapping the resilient molding, means engaging with said structure tending to laterally compress the molding to reduce the width of both of said grooves, a glass frame, a lip extending around the periphery of the frame and entering said second groove and having an inwardly presented channel to receive therein the marginal portion of a sheet of glass, said lip being held and sealed in said resilient molding second groove by said compressing molding, said glass frame being formed in two sections, said sections being retained in glass holding alignment about the glass by said molding.

IRVIN W. RIDER.